(12) United States Patent
Maistre

(10) Patent No.: US 12,085,133 B2
(45) Date of Patent: Sep. 10, 2024

(54) SECURING SYSTEM FOR A PART MOUNTED ON A BRAKE HEAD

(71) Applicant: TALLANO TECHNOLOGIE, Boulogne Billancourt (FR)

(72) Inventor: Adrien Maistre, Vincennes (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 372 days.

(21) Appl. No.: 17/624,135

(22) PCT Filed: Jul. 3, 2020

(86) PCT No.: PCT/FR2020/051179
§ 371 (c)(1),
(2) Date: Dec. 30, 2021

(87) PCT Pub. No.: WO2021/001639
PCT Pub. Date: Jan. 7, 2021

(65) Prior Publication Data
US 2022/0364615 A1    Nov. 17, 2022

(30) Foreign Application Priority Data
Jul. 3, 2019 (FR) ...................... 19 07417

(51) Int. Cl.
*F16D 55/224* (2006.01)
*F16D 65/00* (2006.01)

(52) U.S. Cl.
CPC ..... *F16D 65/0031* (2013.01); *F16D 55/2245* (2013.01)

(58) Field of Classification Search
CPC .......................... F16D 65/0031; F16D 55/2245
(Continued)

(56) References Cited

U.S. PATENT DOCUMENTS 873,532 A * 12/1907 Forsyth ............... F16D 65/0031
105/352
2,504,712 A * 4/1950 Mann .................... F16D 65/092
188/244
(Continued)

FOREIGN PATENT DOCUMENTS

EP    2816250        12/2014
EP    3361115 A1     8/2018
(Continued)

OTHER PUBLICATIONS

Search Report issued in Russian Patent Application No. 2022102388/11 dated May 26, 2023.
(Continued)

*Primary Examiner* — Bradley T King
(74) *Attorney, Agent, or Firm* — NIXON & VANDERHYE

(57) ABSTRACT

Disclosed is a friction assembly for a railway disc brake system for railway rolling stock, the friction assembly including a brake head on the one hand, and on the other hand at least one wear plate made of friction material including a first face which is the friction face, and a second face opposite to the first face, the wear plate being suitable for being integrally secured to the brake head, the friction assembly further including a part able to collect the particles emitted by the wear plate. The part includes a connection able to engage with a fastening element serving to fasten the friction assembly to a brake shoe in such a way that the part is held in a position of being integrally secured to the brake head when the fastening element is fastening the friction assembly to the brake shoe.

12 Claims, 4 Drawing Sheets

(58) Field of Classification Search
USPC .......................................................... 188/244
See application file for complete search history.

(56) References Cited

U.S. PATENT DOCUMENTS

| | | | | |
|---|---|---|---|---|
| 2,988,173 | A * | 6/1961 | Romine | F16D 65/0031 |
| | | | | 188/78 |
| 4,682,905 | A * | 7/1987 | Riding | F16D 65/092 |
| | | | | 188/73.1 |
| 5,162,053 | A * | 11/1992 | Kowalski, Jr. | B08B 17/00 |
| | | | | 55/467 |
| 9,726,241 | B2 * | 8/2017 | Rocca-Serra | F16D 55/225 |
| 10,072,716 | B2 * | 9/2018 | Metayer | F16D 55/22 |
| 11,668,359 | B2 * | 6/2023 | Adamczak | B08B 13/00 |
| | | | | 134/18 |
| 2010/0065387 | A1 * | 3/2010 | Tsiberidis | F16D 65/0031 |
| | | | | 188/218 A |
| 2013/0105252 | A1 * | 5/2013 | Pahle | F16D 65/0031 |
| | | | | 188/71.1 |
| 2014/0054117 | A1 | 2/2014 | Suzuki et al. | |
| 2014/0262633 | A1 * | 9/2014 | Kunzler | B03C 3/41 |
| | | | | 188/73.31 |
| 2015/0001013 | A1 * | 1/2015 | Mennie | B60T 5/00 |
| | | | | 188/73.1 |
| 2020/0149601 | A1 * | 5/2020 | Rocca-Serra | B60T 17/043 |
| 2021/0356005 | A1 * | 11/2021 | Maistre | F16D 65/0031 |
| 2022/0003291 | A1 * | 1/2022 | Maistre | F16D 69/0408 |
| 2023/0287945 | A1 * | 9/2023 | Keller | F16D 65/0031 |

FOREIGN PATENT DOCUMENTS

| | | |
|---|---|---|
| FR | 2997743 | 5/2014 |
| JP | 2010164183 A | 7/2010 |
| JP | 2010-190251 A | 9/2010 |
| JP | 2011-236924 A | 11/2011 |
| RU | 2 557 097 C2 | 7/2015 |
| WO | 2019/025722 | 2/2019 |

OTHER PUBLICATIONS

International Search Report for PCT/FR2020/051179, mailed Dec. 3, 2020, 4 pages.
Written Opinion of the ISA for PCT/FR2020/051179, mailed Dec. 3, 2020, 5 pages.
Office Action, issued in European Patent Application No. 20760895.1 dated May 2, 2024.

* cited by examiner

[Fig. 1]
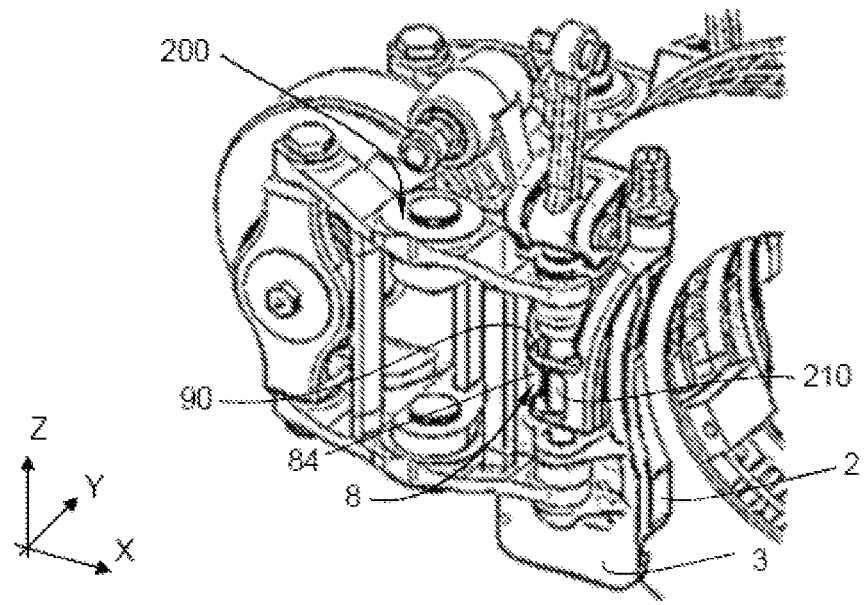
[Fig. 2]
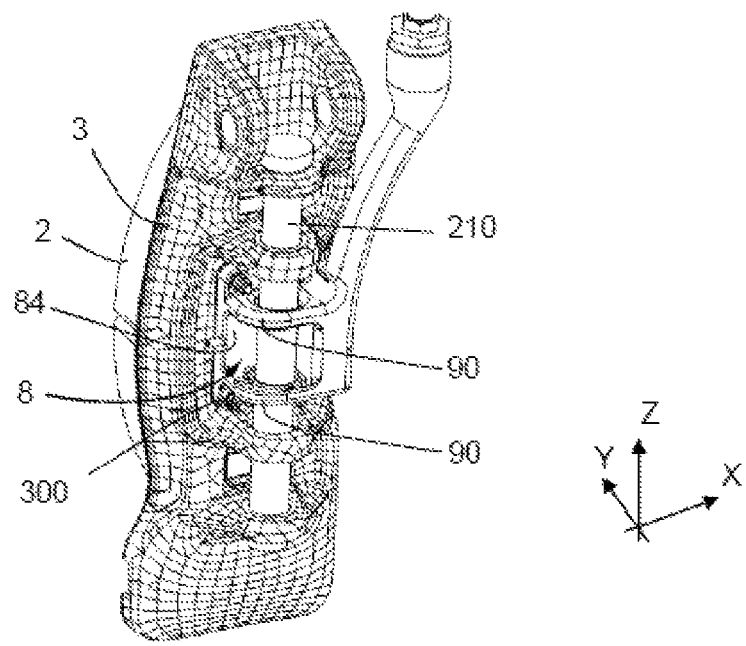

[Fig. 3]
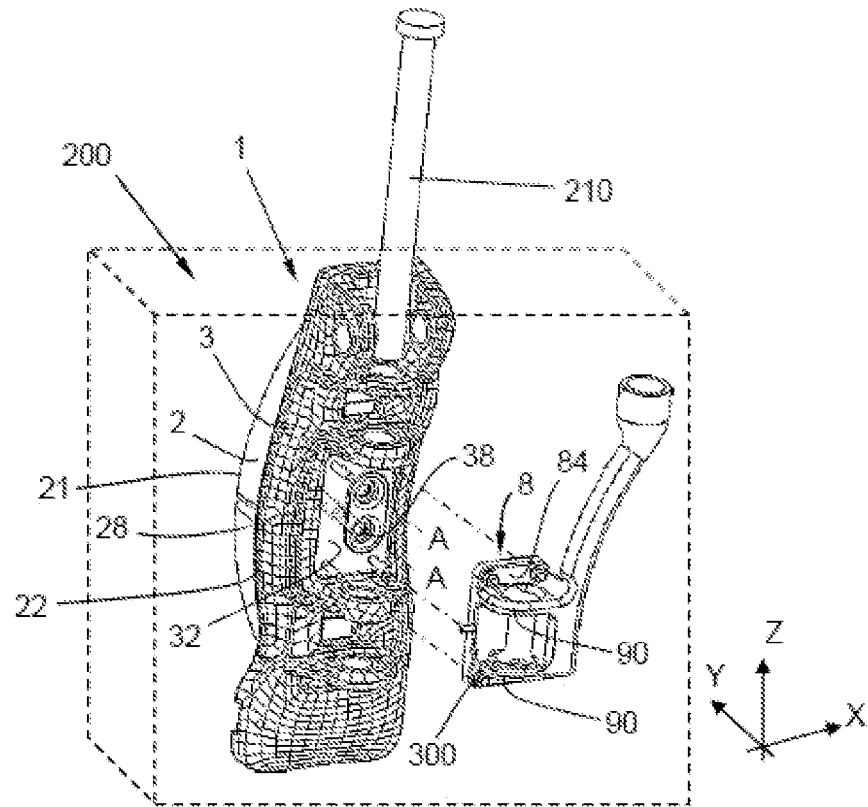
[Fig. 4]
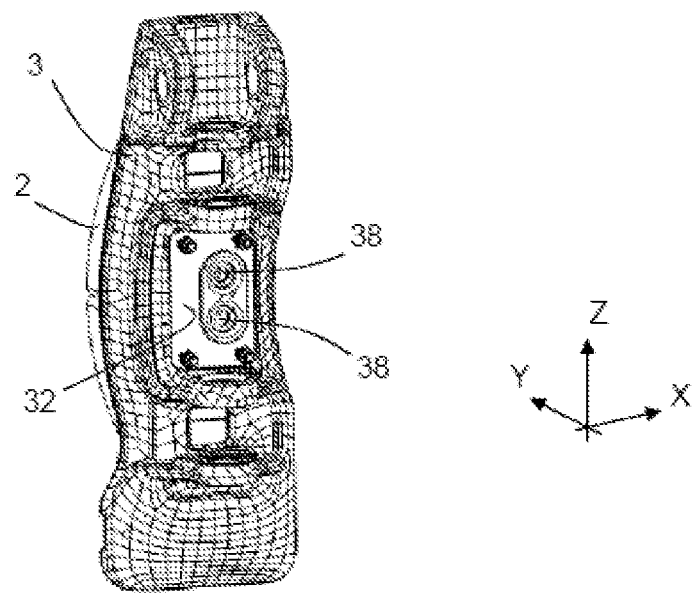

[Fig. 5]
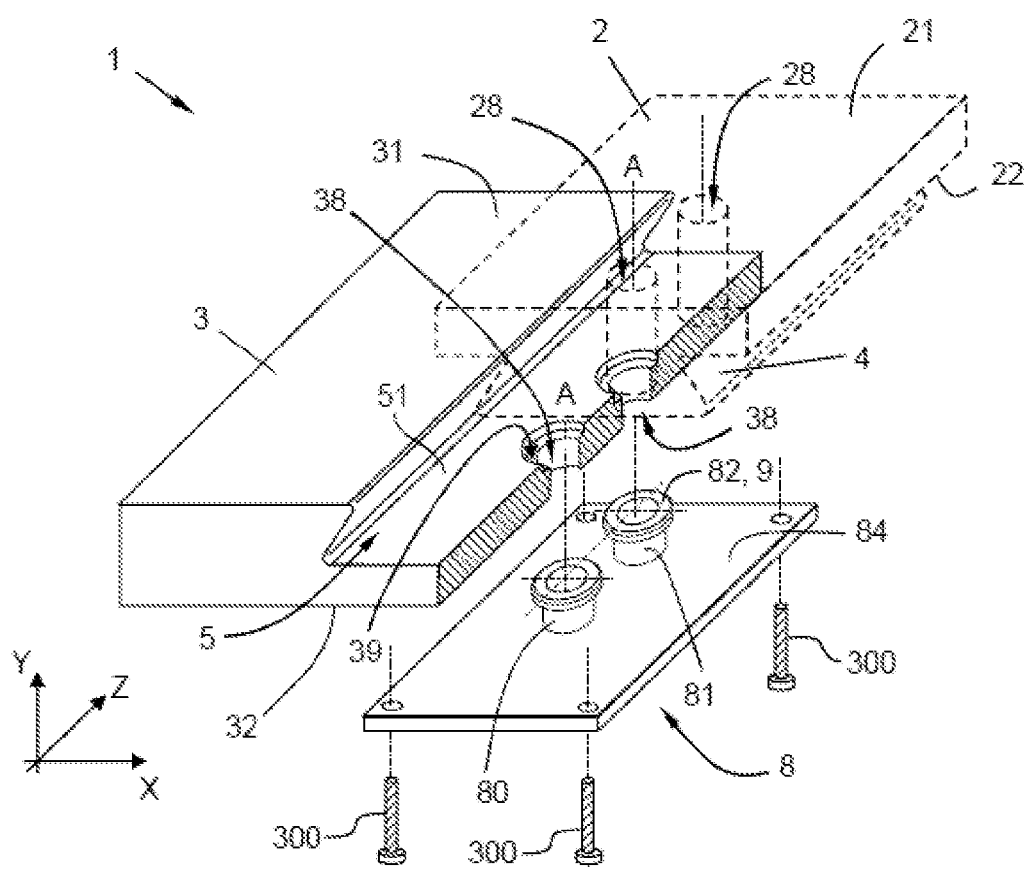

[Fig. 6] PRIOR ART
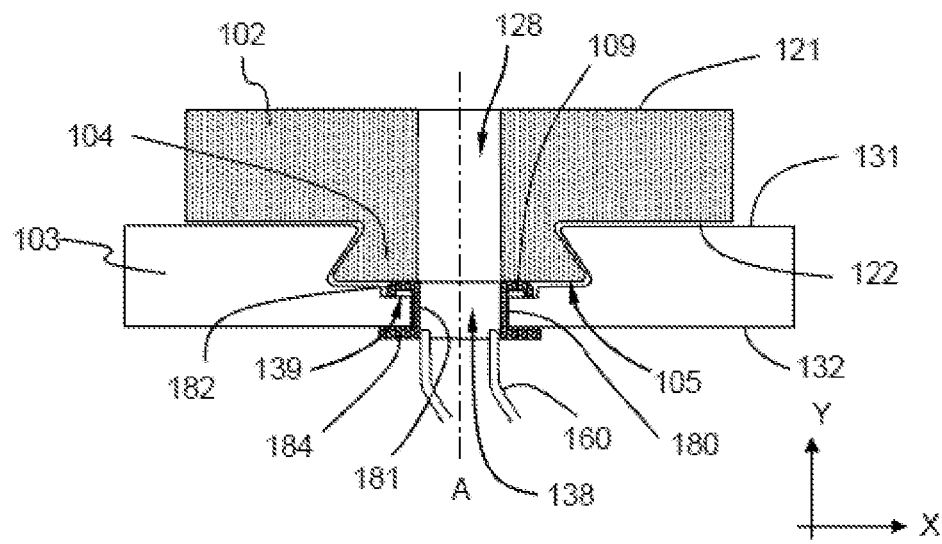
[Fig. 7] PRIOR ART
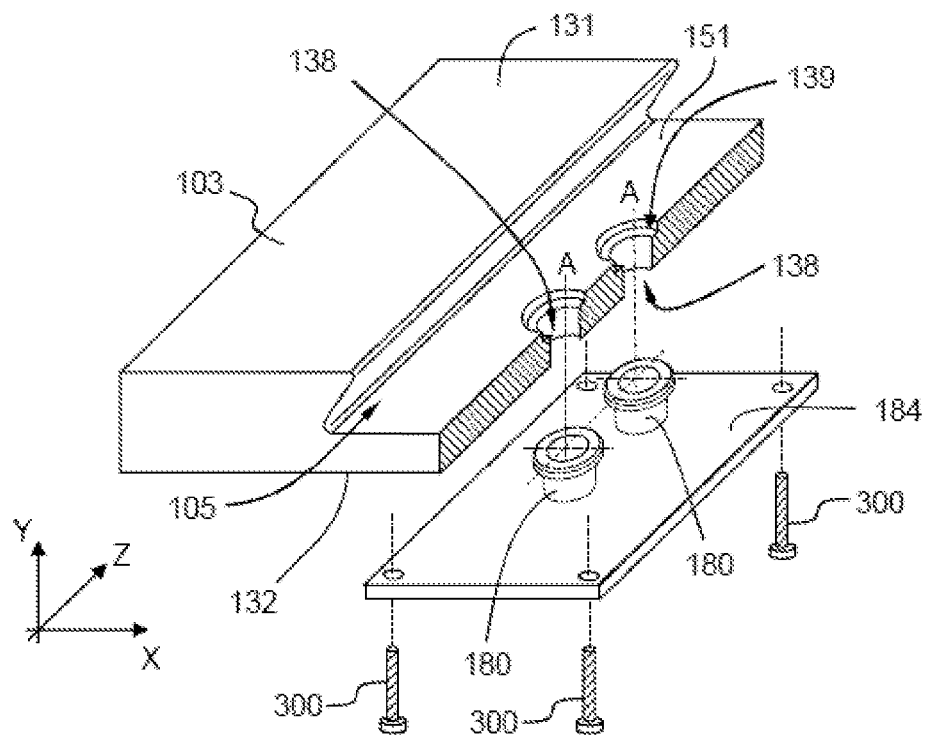

US 12,085,133 B2

SECURING SYSTEM FOR A PART MOUNTED ON A BRAKE HEAD

This application is the U.S. national phase of International Application No. PCT/FR2020/051179 filed 3 Jul. 2020, which designated the U.S. and claims priority to FR Patent Application No. 19 07417 filed 3 Jul. 2019, the entire contents of each of which are hereby incorporated by reference.

BACKGROUND OF THE INVENTION

Field of the Invention

This invention relates to the braking of railway rolling stock and in particular the friction assemblies of the braking systems of railway rolling stock. Rolling stock is understood to mean all vehicles configured to run on rails, such as trains, trams, and underground transit.

Description of the Related Art

The braking system generally comprises a disc integral with a wheel or axle of the railway rolling stock. The braking system further comprises a friction assembly which comprises a brake head 103 which supports a friction wear plate 102. Such a friction assembly is illustrated in FIG. 6 and FIG. 7, which represent the prior art. The brake head 103 extends longitudinally in a longitudinal direction Z, and transversely in a transverse direction X. The brake head 103 comprises, in the X-Z plane, an upper face 131 intended to accommodate the friction wear plate 102, and a lower face 132. The axis perpendicular to these two faces and to the X-Z plane is a Y axis.

The friction wear plate 102 comprises a friction face 121 which carries a friction pad. This friction pad is intended to be in frictional contact with the disc (not shown) integral with the wheel or axle, in order to exert braking force when a driver actuates the braking system. Generally, railway rolling stock have two friction assemblies, arranged one on each side of the disc so as to grip, or in other words sandwich, the disc in order to compress it on both sides. The friction wear plate 102 also comprises an opposite face 122. This opposite face 122 is fixed to the brake head 103 by fastening means. In this case, these fastening means comprise a profiled section having a convex dovetailing projection 104 on the opposite face 122, and a receiving slide 105 on the upper face 131 of the brake head 103, this profiled section 104 being configured to engage with the receiving slide 105. The receiving slide 105 extends in the longitudinal direction Z.

When the friction wear plate 102 rubs against the disc, particles of material from the friction pad and disc are emitted into the ambient atmosphere around the friction assembly. The braking system thus emits atmospheric pollution in the form of more or less fine particles. The friction assembly described above seeks to capture these particles of material emitted during braking.

For this purpose, the friction wear plate 102 comprises two channels 128 oriented along the Y axis. The friction wear plate 102 may be in one or two parts. In the latter case each of these parts comprises a channel 128. The brake head 103 has two through-holes 138. When the friction wear plate 102 is fixed to the brake head 103 in use as described above, each of the two channels 128 is located facing a hole 138. The main axis of a channel 128 and of the hole 138 located facing it is denoted as the A axis, this channel 128 and this hole 138 therefore being coaxial. Each channel 128 thus forms, with one of the through-holes 138 formed in the brake head 103, a circuit which makes it possible to suction particles emitted by the friction wear plate 102 during braking.

A joining bushing 180, consisting of a tube 181 and a flange 182 extending radially outward from this tube 181 at one of its ends, is mounted in the hole 138. The tube 181 is inserted in the hole 138, the outside diameter of the tube 181 being equal to the inside diameter of the hole 138 in order to ensure the best possible seal. The flange 182 is housed in an annular housing 139 of the brake head 103, this housing 139 being centered on the main axis A and facing the opposite face 122 of the wear plate 102. The flange 182 is thus sandwiched between the lower face 122 of the profiled section 104 of the wear plate 102 and the bottom 151 of the slide 105 of the brake head 103.

The joining bushing 180 passes entirely through the brake head 103 and protrudes from it on its lower face 132. To this end of the tube 181 of the bushing 180, a pipe 160 is fixed which is connected to a suction device (not shown) and which makes it possible to suction, through the channel 128 and hole 138, the particles resulting from the braking of the rail vehicle. FIG. 6 illustrates a cross-section in the XY plane containing the main axis A, i.e. at the channel 128 and hole 138.

The joining bushing 180 serves to guide the particles resulting from braking, from the channel 128 of the wear plate 102 to the through-hole 138 of the brake head 103. The joining bushing 180 therefore aims to prevent possible leaks through the channel 128 and hole 138.

In particular, the joining bushing 180 aims to limit the quantity of particles resulting from braking which could slip into the gap at the interface between the friction wear plate 102 and the brake head 103, and especially to prevent air flow from the outside to enter the hole 138 via this gap, which would degrade the suctioning by the suction device. For this purpose, the flange 182 has, at its radially outer end, a lip which is folded back towards the tube 181. The depth of the annular housing 139 (along the main axis A) is less than the height of the flange 182 at rest, such that the flange 182 protrudes above the bottom 151 of the slide 105. When the profiled section 104 of the wear plate 102 is inserted into the slide 105, this profiled section 104 presses on the bushing 180 along axis A such that the lip of the flange 182 is deformed to fill the housing 139. The flange 182 thus comes to bear against the profiled section 104, ensuring the seal between the friction wear plate 102 and the brake head 103. The flange 182 thus constitutes a return mechanism 109 which presses the flange 182 against the profiled section 104.

Advantageously, the tube 181 is extended at its end opposite to the end carrying the flange 182, by a plate 184 which fits against the lower face 132 of the brake head 103. When the tube 181 is housed in the hole 138, the plate 184 thus bears against the lower face 132. The advantage of this configuration is that the creation of the seal between the brake head 103 and the wear plate 102 is achieved in a simple manner by inserting the tube 181 and flange 182 in the hole 183, with no need to use a separate return mechanism.

In addition, the bushing 180 is held in place in the hole 138 by means of the plate 184.

As shown in FIG. 7, the plate 184 carries two joining bushings 180. The tube 181 of each of the bushings 180 is thus extended at its end opposite to the end carrying the flange 182, by the plate 184.

The brake head 103 is shown in a perspective longitudinal section view (in the vertical plane Y-Z) at its middle, meaning at the middle of the slide 105. The assembly of the plate 184 and joining bushings 180 is shown in an exploded perspective view. The two bushings 180 are intended to be inserted into the holes 138 along the main axes A, in the direction of the vertical axis Y.

The advantage of this variant is that it is possible, with a single assembly consisting of the plate 184 and joining bushings 180, to create the seal between the entire brake head 103 and the entire wear plate(s) 102.

The plate 184 is fixed to the brake head 103 by mechanical means, for example by four bolts 300, as is schematically illustrated in FIG. 7.

A friction assembly is thus known for a railway disc brake system for railway rolling stock, the friction assembly comprising a brake head on the one hand, and on the other hand at least one wear plate made of friction material comprising a first face which is the friction face, and a second face opposite to said first face, the wear plate being suitable for being integrally secured to the brake head, the friction assembly further comprising a part able to collect the particles emitted by said wear plate (in the above case, this part is the assembly consisting of the plate 184 and the joining bushings 180).

During use, under the effect of vibrations, from forces undergone by the wear plate and the brake head, there is a risk that the part will come loose from the brake head. This loss of the part would be detrimental, in particular given the speed of the vehicle.

SUMMARY OF THE INVENTION

The invention aims to remedy this disadvantage.

The invention aims to provide a friction assembly in which the connection between the part and the brake head is made secure.

This object is achieved due to the fact that the part comprises a connection able to engage with a fastening element serving to fasten the friction assembly to a brake shoe such that the part is held in a position of being integrally secured to the brake head when the fastening element is fastening the friction assembly to the brake shoe.

By means of these arrangements, the part is held in its position of being integrally secured to the brake head, and cannot come out of this position as long as the fastening element is fastening the friction assembly to the brake shoe. The part is thus held in its securing position by this fastening element which constitutes extra security for any mechanical connection between this part and the brake head. This extra security is achieved simply by modifying the part to add the connection to it.

For example, the connection at least partially surrounds the fastening element.

For example, the fastening element is a rod, and the connection consists of at least one ring through which the rod is able to slide.

Advantageously, the connection consists of two rings.

The part is thus held more effectively in its position of being integrally secured to the brake head.

Advantageously, the wear plate comprises at least one channel traversing the wear plate from the first face to the second face, the brake head comprising at least one through-hole of central axis A and located facing one among the at least one channel, and the part comprises a plate and at least one joining bushing mounted on the plate, the at least one joining bushing being inserted into at least one through-hole and establishing a connection with at least one channel, the part being in a position of being integrally secured to the brake head when the at least one joining bushing is inserted in the at least one through-hole.

Thus, the suctioning in the joining bushing(s) of particles emitted by the friction wear plate is more efficient.

Advantageously, the friction assembly comprises two joining bushings, two channels, and two through-holes.

BRIEF DESCRIPTION OF THE DRAWINGS

The invention will be better understood and its advantages will be more apparent from reading the following detailed description of embodiments shown as non-limiting examples. The description refers to the accompanying drawings, in which:

FIG. 1 is a perspective view of a brake shoe and a friction assembly according to the invention;

FIG. 2 is a perspective view of a friction assembly according to one embodiment of the invention;

FIG. 3 is an exploded perspective view of the friction assembly of FIG. 2;

FIG. 4 is a perspective view of the brake head and the wear plate of a friction assembly according to one embodiment of the invention;

FIG. 5 is an exploded perspective view of the brake head, the wear plate, and the part, of a friction assembly according to one embodiment of the invention;

FIG. 6, already described, is a cross-section of the brake head, the wear plate, and the plate of a friction assembly according to the prior art;

FIG. 7, already described, is a perspective cross-section view of the brake head and the plate of a friction assembly according to the prior art.

DESCRIPTION OF THE PREFERRED EMBODIMENTS

With reference to FIG. 5, a friction assembly 1 is described which comprises a brake head 3 which supports a friction wear plate 2. The brake head 3 extends longitudinally in a longitudinal direction Z, and transversely in a transverse direction X. The brake head 3 comprises, in the X-Z plane, an upper face 31 intended to accommodate the friction wear plate 2, and a lower face 32. The axis perpendicular to these two faces and to the X-Z plane is a Y axis.

The friction wear plate 2 comprises a friction face 21 which carries a friction pad. This friction pad is intended to be in frictional contact with the disc (not shown) integral with the wheel or axle, in order to exert braking force when a driver actuates the braking system. Generally, railway rolling stock have two friction assemblies, arranged one on each side of the disc so as to grip, or in other words sandwich, the disc in order to compress it on both sides. The friction wear plate 2 also comprises an opposite face 22. The friction wear plate 2 is integrally secured to the brake head 3 by securing means such that the opposite face 22 is facing and at least partially fitting against the upper face 31. In the current case, these securing means consist of a profiled section having a convex dovetailing projection 4 on the opposite face 22, and a receiving slide 5 on the upper face 31 of the brake head 3, this profiled section 4 being configured to engage with the receiving slide 105. The receiving slide 5 extends in the longitudinal direction Z. In FIG. 5, the brake head 3 is shown in a perspective longitudinal cross-section view (in the vertical plane Y-Z) at its middle, meaning at the middle of the slide 5. For clarity, the wear plate 2 is represented by dotted lines. The wear plate 2 is represented with the profiled section 4 partially engaged in the receiving slide 5.

Other means (4, 5) for integrally securing the friction wear plate 2 to the brake head 3 are possible. Advantageously, these securing means allow removably securing the friction wear plate 2 with the brake head 3.

When the friction wear plate 2 rubs against the disc, particles of material from the friction pad and disc are emitted into the ambient atmosphere around the friction assembly.

In order to capture these particles, the friction wear plate 2 comprises a part 8. The part 8 is able to collect the particles and is located on the lower face 32 side of the brake head 3. For example, the part 8 is pressed against the lower face 32. For example, the part 8 is fixed to the lower face 32.

The invention is described below in the embodiment where the part 8 comprises one or more joining bushings 80 which traverse the brake head 3. Advantageously, the part 8 further comprises a plate 84 on which the joining bushings 80 are mounted. However, the part 8 may have any other geometry and may be composed of elements other than those described.

In order to capture the particles of material, the friction wear plate 2 comprises two channels 28 oriented along the Y axis. The friction wear plate 2 may be in one or two parts. In the latter case, each of these parts comprises a channel 28. The brake head 3 has two through-holes 38. When the friction wear plate 2 is secured to the brake head 3 in use as described above, each of the two channels 28 is located facing a hole 38. The term A axis denotes the main axis of a channel 28 and of the hole 38 facing it, this channel 28 and this hole 38 therefore being coaxial. Each channel 28 therefore forms, with one of the through-holes 38, a circuit which makes it possible to suction particles emitted by the friction pad 2 during braking, as explained below.

A joining bushing 80, consisting of a tube 81 and a flange 82 radially and outwardly extending this tube 81 at one of its ends, is mounted in the hole 38. The tube 81 is inserted into the hole 38, the outside diameter of the tube 81 being equal to the inside diameter of the hole 38 in order to ensure the best possible seal. The flange 82 is housed in an annular housing 39 of the brake head 3, this housing 39 being centered on the main axis A and facing the opposite face 22 of the wear plate 2. The flange 82 is thus sandwiched between the lower face 22 of the profiled section 4 of the wear plate 2 and the bottom 51 of the slide 5 of the brake head 3.

The joining bushing 80 entirely traverses the brake head 3 and protrudes from it on its lower face 32. To this end of the tube 81 of the bushing 80 is fixed a pipe (not shown) which is connected to a suction device (not shown) and which enables suctioning, through the channel 28 and the hole 38, the particles resulting from the braking of the rail vehicle.

The joining bushing 80 serves to guide the particles resulting from braking, from the channel 28 of the wear plate 2 to the through-hole 38 of the brake head 3. The joining bushing 80 therefore aims to prevent possible leaks through the channel 28 and hole 38.

In particular, the joining bushing 80 aims to limit the quantity of particles resulting from braking which could slip into the gap at the interface between the friction wear plate 2 and the brake head 3, and above all to prevent air flow from the outside to enter the hole 38 through this gap, which would degrade the suctioning by the suction device. For this purpose, the flange 82 has, at its radially outer end, a lip which is folded back towards the tube 81. The depth of the annular housing 39 (along the main axis A) is less than the height of the flange 82 at rest, such that the flange 82 protrudes above the bottom 51 of the slide 5. When the profiled section 4 of the wear plate 2 is inserted into the slide 5, this profiled section 4 presses on the bushing 80 along axis A such that the lip of the flange 82 is deformed to fill the housing 39. The flange 82 thus comes to bear against the profiled section 4, ensuring the seal between the friction wear plate 2 and the brake head 3. The flange 82 thus constitutes a return mechanism 9 which presses the flange 82 against the profiled section 4. Alternatively, a return device 9 separate from the flange 82 (for example a spring) can press the flange 82 against the profiled section 4 to ensure this sealing.

Advantageously, the tube 81 is extended at its end opposite to the end carrying the flange 82, by a plate 84 which fits against the lower face 32 of the brake head 3. When the tube 81 is housed in the hole 38, the plate 84 thus bears against the lower face 32. The advantage of this configuration is that the creation of the seal between the brake head 3 and the wear plate 2 is achieved in a simple manner by inserting the tube 81 and flange 82 into the hole 83, with no need to use a separate return mechanism. In addition, the bushing 80 is held in place in the hole 38 by means of the plate 84. The part 8 thus comprises the bushing or bushings 80 and the plate 84.

As shown in FIG. 5, the wear plate 2 comprises two channels 28, and the brake head 3 comprises two holes 38. The two channels 28 come into alignment (coaxiality of axis A) with the two holes 38 when the profiled section 4 of the wear plate 2 is fully engaged with the receiving slide 5 of the brake head 3, meaning when the wear plate 2 is integrally secured to the brake head 3. The wear plate 2 is shown with the profiled section 4 partially engaged in the receiving slide 5 such that only one of the channels 28 is in alignment with one of the holes 38.

The plate 84 carries two joining bushings 80. The tube 81 of each of the bushings 80 is thus extended, at its end opposite to the end carrying the flange 82, by the plate 84. Each of the bushings 80 is intended to be arranged and housed in one of the holes 38.

In the general case, the wear plate 2 comprises at least one channel 28 traversing the wear plate 2 from the first face 21 to the second face 22 of the wear plate 2, the brake head 3 comprising at least one through-hole 38 of central axis A and located facing one among the at least one channel 28, and at least one joining bushing 80 arranged in the at least one through-hole 38 and establishing a connection with the at least one channel 28, the at least one joining bushing 80 being mounted on a plate 84.

When the part 8 is in the position of being integrally secured to the brake head 3, the at least one joining bushing 80 is inserted in the at least one through-hole 38. The plate 84 is fixed to the brake head 3 by mechanical means, for example by four bolts 300, as is schematically illustrated in FIG. 5. The plate 84 is then perpendicular to the main axis A of the channels 28. These mechanical means thus constitute a mechanical connection between the part 8 and the brake head 3.

FIG. 3 is an exploded perspective view which shows the friction assembly 1 with the wear plate 2 integrally secured to the brake head 3, plate 84 being separated from the brake head 3 (translation along the Y axis, or equivalently along the main axis A). The two joining bushings 80 are not directly visible as they extend from the hidden side of plate 84.

A fastening element 210 serves to fasten the friction assembly 1 to a brake shoe 200, which is schematically represented with dotted lines in FIG. 3. The elements constituting this brake shoe 200 are visible in FIG. 1. For example, this fastening element 210 is a rod which passes through hoops of the brake head 3 and hoops of the brake shoe 200 (hoops visible in FIG. 1). In FIG. 3 this rod is shown offset translationally along its longitudinal axis so that it is not engaged in the hoops of the brake head 3. As illustrated in FIG. 1, the fastening element 210 is kept inserted into the hoops of the brake head 3 and the hoops of the brake shoe 200 by its shape (flattened rod head) and/or by another element of the brake shoe.

In FIG. 3, the wear plate 2 is secured to the brake head 3. Only the opening of the through-hole 38 in the lower face 32 of the brake head 3 is visible. The through-hole 38 which traverses the brake head 3, and the channel 28 traversing the wear plate 2 and located in the extension of the hole 38, are not directly visible and are represented by dotted lines in FIG. 3.

The part 8 comprises a connection 90 able to engage with this fastening element 210 so that the part 8 is held in its position of being integrally secured to the brake head 3 when the fastening element 210 is fastening the friction assembly 1 to the brake shoe 200. The connection 90 is formed by two rings which extend substantially perpendicularly from the plate 84, away from the brake head 3. The two rings are therefore located in two parallel planes (Y, Z).

In the current case, the fastening element 210, which is a rod, passes through the two rings of the connection 90 such that the plate 84 is sandwiched between this rod and the brake head 3. Given that this rod also passes through the hoops of the brake head 3, the part 8 is held in its position of being integrally secured to the brake head 3 by the fastening element 210.

FIG. 2 shows the same friction assembly 1, with the part 8 in the position of being integrally secured to the brake head 3, and with the fastening element 210 engaged with the connection 90 of the plate 84 such that the part 8 is held in this integrally secured position.

FIG. 4 shows the same friction assembly 1, without the part 8 and without the fastening element 210.

Connections 90 other than the one described below are possible. For example, the rings forming the connection 90 may extend over only part of the circumference, or the connection 90 may have only one ring.

More generally, the connection 90 at least partially surrounds the fastening element 210. Thus, in the case where the connection 90 only partially surrounds the fastening element 210, the connection 90 has a "C" shape so as to surround a portion of the fastening element 210 without encircling the circumference of the fastening element 210, i.e. without forming a ring. Alternatively, in the case where the connection 90 completely encircles the fastening element 210, the connection 90 has an "O" shape so as to encircle a portion of the fastening element 210 around its entire circumference (thus forming a ring).

In all cases, the mechanical cooperation (mechanical engagement) between the connection 90 and the fastening element 210 is implemented such that when the fastening element 210 is fastening the friction assembly 1 to the brake shoe 200, the part 8 is held in a position of being integrally secured to the brake head 3 and cannot be removed.

The connection 90 is formed by modifying the plate 84. For example, this modification is the addition of a part which is attached to and held on the plate 84 by a mechanical connection. Thus, the rings forming the connection 90 can be mechanically fixed on the plate 84 (for example by bolts-nuts).

Advantageously, the connection 90 is formed by modifying the shape of the plate 84, meaning without adding an additional part.

In general, the part 8 (for example the plate 84) is sandwiched between the fastening element 210 and the brake head 3, which holds the part 8 in its position of being integrally secured to the brake head 3.

The connection 90 further enables increasing the rigidity of the plate 84.

The invention claimed is:

1. A friction assembly for a railway disc brake system for railway rolling stock, said friction assembly comprising:
    a brake head;
    at least one wear plate made of friction material comprising a first face which is the friction face, and a second face opposite to said first face, said at least one wear plate being configured to be integrally secured to said brake head; assembly further comprising
    a part configured to collect the particles emitted by said wear plate, said part comprising a connection configured to engage with a fastening element serving to fasten said friction assembly to a brake shoe such that said part is held in a position of being integrally secured to said brake head when said fastening element is fastening the friction assembly to said brake shoe.

2. The friction assembly according to claim 1, wherein said connection at least partially surrounds said fastening element.

3. The friction assembly according to claim 2, wherein said fastening element is a rod, and said connection comprises at least one ring through which said rod is able to slide.

4. The friction assembly according to claim 3, wherein said connection consists of two rings.

5. The friction assembly according to claim 1, wherein said wear plate comprises at least one channel traversing said wear plate from said first face to said second face, said brake head comprising at least one through-hole of central axis and located facing one among said at least one channel, and
    wherein said part comprises a plate and at least one joining bushing mounted on said plate, said at least one joining bushing being configured to be inserted into said at least one through-hole and establishing a connection with said at least one channel, said part being in a position of being integrally secured to said brake head when said at least one joining bushing is inserted in said at least one through-hole.

6. The friction assembly according to claim 5, wherein the at least one joining bushing comprises two joining bushings, the at least one channel comprises two channels, and the at least one through-hole comprises two through-holes.

7. The friction assembly according to claim 2, wherein said wear plate comprises at least one channel traversing said wear plate from said first face to said second face, said brake head comprising at least one through-hole of central axis and located facing one among said at least one channel, and
    wherein said part comprises a plate and at least one joining bushing mounted on said plate, said at least one joining bushing being configured to be inserted into said at least one through-hole and establishing a connection with said at least one channel, said part being in a position of being integrally secured to said brake head when said at least one joining bushing is inserted in said at least one through-hole.

8. The friction assembly according to claim 3, wherein said wear plate comprises at least one channel traversing said wear plate from said first face to said second face, said brake head comprising at least one through-hole of central axis and located facing one among said at least one channel, and wherein said part comprises a plate and at least one joining bushing mounted on said plate, said at least one joining bushing being configured to be inserted into said at least one through-hole and establishing a connection with said at least one channel, said part being in a position of being integrally secured to said brake head when said at least one joining bushing is inserted in said at least one through-hole.

9. The friction assembly according to claim 4, wherein said wear plate comprises at least one channel traversing said wear plate from said first face to said second face, said brake head comprising at least one through-hole of central axis and located facing one among said at least one channel, and wherein said part comprises a plate and at least one joining bushing mounted on said plate, said at least one joining bushing being configured to be inserted into said at least one through-hole and establishing a connection with said at least one channel, said part being in a position of being integrally secured to said brake head when said at least one joining bushing is inserted in said at least one through-hole.

10. The friction assembly according to claim 7, wherein
the at least one joining bushing comprises two joining bushings,
the at least one channel comprises two channels, and
the at least one through-hole comprises two through-holes.

11. The friction assembly according to claim 8, wherein
the at least one joining bushing comprises two joining bushings,
the at least one channel comprises two channels, and
the at least one through-hole comprises two through-holes.

12. The friction assembly according to claim 9, wherein
the at least one joining bushing comprises two joining bushings,
the at least one channel comprises two channels, and
the at least one through-hole comprises two through-holes.

\* \* \* \* \*